United States Patent [19]

Odenwalder et al.

[11] Patent Number: 5,949,814

[45] Date of Patent: Sep. 7, 1999

[54] HIGH-DATA-RATE SUPPLEMENTAL CHANNEL FOR CDMA TELECOMMUNICATIONS SYSTEM

[75] Inventors: Joseph P. Odenwalder; Franklin P. Antonio, both of Del Mar; Edward G. Tiedemann, Jr.; Yu-Cheun Jou, both of San Diego, all of Calif.

[73] Assignee: Qualcomm Incorporated, San Diego, Calif.

[21] Appl. No.: 09/170,903

[22] Filed: Oct. 13, 1998

Related U.S. Application Data

[62] Division of application No. 08/784,281, Jan. 15, 1997.

[51] Int. Cl.$^6$ ..................................................... H04K 1/00
[52] U.S. Cl. ............................................ 375/200; 370/260
[58] Field of Search ................................... 375/200, 260, 375/377, 206, 295, 298, 308, 261, 279, 280; 370/206, 342, 335, 441, 209

[56] References Cited

U.S. PATENT DOCUMENTS

| | | | |
|---|---|---|---|
| 3,310,631 | 3/1967 | Brown | 179/15 |
| 3,715,508 | 2/1973 | Blasbalg | 179/15 BC |
| 4,052,565 | 10/1977 | Baxter et al. | 179/1.5 S |
| 4,135,059 | 1/1979 | Schmidt | 179/15 |
| 4,220,821 | 9/1980 | Lucas | 370/110 |
| 4,256,925 | 3/1981 | Good | 370/104 |
| 4,291,406 | 9/1981 | Bahl et al. | 371/44 |
| 4,291,409 | 9/1981 | Weinberg et al. | 375/1 |
| 4,298,979 | 11/1981 | Dobyns et al. | 370/104 |
| 4,301,530 | 11/1981 | Gutleber | 370/18 |
| 4,319,353 | 3/1982 | Alvarez, III et al. | 370/104 |
| 4,322,845 | 3/1982 | Fennel, Jr. et al. | 370/104 |
| 4,339,818 | 7/1982 | Gruenberg | 370/112 |
| 4,369,434 | 1/1983 | Mueller | 340/347 |
| 4,373,151 | 2/1983 | Houdard et al. | 329/104 |
| 4,383,315 | 5/1983 | Torng | 370/89 |
| 4,424,417 | 1/1984 | Chavey et al. | 179/2 E |
| 4,445,213 | 4/1984 | Baugh et al. | 370/94 |
| 4,455,649 | 6/1984 | Esteban et al. | 370/80 |
| 4,460,992 | 7/1984 | Gutleber | 370/19 |
| 4,472,815 | 9/1984 | Gutleber | 375/34 |
| 4,477,900 | 10/1984 | Gruenberg | 370/112 |
| 4,491,947 | 1/1985 | Frank | 370/94 |
| 4,494,232 | 1/1985 | Dambrackas et al. | 370/80 |
| 4,547,880 | 10/1985 | De Vita et al. | 370/91 |
| 4,562,572 | 12/1985 | Goldman et al. | 370/80 |
| 4,587,652 | 5/1986 | Goldman | 370/110.1 |
| 4,594,476 | 6/1986 | Kerr | 364/821 |
| 4,635,221 | 1/1987 | Freeman | 179/6.08 |
| 4,688,035 | 8/1987 | Gray et al. | 340/825.52 |

(List continued on next page.)

FOREIGN PATENT DOCUMENTS

| | | |
|---|---|---|
| 0412583 | 2/1991 | European Pat. Off. .......... H04B 1/56 |
| 0418865 | 3/1991 | European Pat. Off. ........ H04L 12/56 |
| 0444592 | 9/1991 | European Pat. Off. ........ H04B 1/212 |
| 2022365 | 12/1979 | United Kingdom ............. H04Q 7/04 |
| 2182528 | 5/1987 | United Kingdom ............. H04J 3/00 |
| 9107030 | 5/1991 | WIPO ............................... H04J 3/06 |
| 9503652 | 2/1995 | WIPO . |

OTHER PUBLICATIONS

Kreyszig, Erwin "Advance Engineering Mathematics" John Wiley & Sons, Section 4.7 1979, pp. 186–190.

*Primary Examiner*—Tesfaldet Bocure
*Attorney, Agent, or Firm*—Russell B. Miller; Bruce W. Greenhaus; Kent D. Baker

[57] ABSTRACT

A novel and improved method for implementing a high-transmission-rate over-the-air interface is described. A transmit system provides an in-phase channel set and a quadrature-phase channel set. The in-phase channel set is used to provide a complete set of orthogonal medium rate control and traffic channels. The quadrature-phase channel set is used to provide a high-rate supplemental channel and an extended set of medium rate channels that are orthogonal to each other and the original medium rate channels. The high-rate supplemental channel is generated over a set of medium rate channels using a short channel code. The medium rate channel are generated using a set of long channel codes.

6 Claims, 9 Drawing Sheets

U.S. PATENT DOCUMENTS

| | | | |
|---|---|---|---|
| 4,726,014 | 2/1988 | Goldman et al. | 370/58 |
| 4,730,340 | 3/1988 | Frazier Jr. et al. | 375/1 |
| 4,774,987 | 10/1988 | Sepling | 144/208 B |
| 4,839,892 | 6/1989 | Sasaki | 370/95 |
| 4,870,642 | 9/1989 | Nohara et al. | 370/75 |
| 4,872,200 | 10/1989 | Jansen | 380/34 |
| 4,876,698 | 10/1989 | Boisson et al. | 375/25 |
| 4,899,337 | 2/1990 | Hirai | 370/80 |
| 4,901,307 | 2/1990 | Gilhousen et al. | 370/18 |
| 4,930,118 | 5/1990 | Sugihara | 370/16 |
| 4,933,952 | 6/1990 | Albrieux et al. | 375/1 |
| 4,939,745 | 7/1990 | Kirimoto et al. | 375/1 |
| 4,965,796 | 10/1990 | Petty | 370/112 |
| 4,970,648 | 11/1990 | Capots | 364/424.06 |
| 5,003,533 | 3/1991 | Watanabe | 370/85.5 |
| 5,003,534 | 3/1991 | Gerhardt et al. | 370/94 |
| 5,068,849 | 11/1991 | Tanaka | 370/85.5 |
| 5,101,501 | 3/1992 | Gilhousen et al. | 455/33 |
| 5,103,459 | 4/1992 | Gilhousen et al. | 375/1 |
| 5,107,377 | 4/1992 | Ballard | 360/40 |
| 5,115,429 | 5/1992 | Hiuchyj et al. | 370/84 |
| 5,121,383 | 6/1992 | Golestani | 370/60 |
| 5,168,575 | 12/1992 | Cizek et al. | 455/33.1 |
| 5,172,375 | 12/1992 | Kou | 370/95.3 |
| 5,179,549 | 1/1993 | Joos et al. | 370/17 |
| 5,212,684 | 5/1993 | MacNamee et al. | 370/24 |
| 5,212,687 | 5/1993 | De La Bourdonnaye | 370/84 |
| 5,216,503 | 6/1993 | Paik et al. | 358/133 |
| 5,231,649 | 7/1993 | Duncanson | 375/38 |
| 5,276,730 | 1/1994 | Cimini, Jr. et al. | 379/60 |
| 5,280,537 | 1/1994 | Sugiyama et al. | 375/1 |
| 5,293,640 | 3/1994 | Gunmar et al. | 455/33.1 |
| 5,305,308 | 4/1994 | English et al. | 370/32.1 |
| 5,349,580 | 9/1994 | Hester et al. | 370/84 |
| 5,351,240 | 9/1994 | Highsmith | 370/84 |
| 5,381,412 | 1/1995 | Otani | 370/84 |
| 5,400,328 | 3/1995 | Burren et al. | 370/79 |
| 5,416,797 | 5/1995 | Gilhousen et al. | 375/705 |
| 5,420,861 | 5/1995 | De La Bourdonnaye | 370/84 |
| 5,440,542 | 8/1995 | Procter et al. | 370/18 |
| 5,442,625 | 8/1995 | Gitlin et al. | 370/18 |
| 5,511,073 | 4/1996 | Padovani et al. | 370/82 |
| 5,583,851 | 12/1996 | Kato et al. | 370/342 |
| 5,689,511 | 11/1997 | Shimazaki et al. | 370/545 |
| 5,737,326 | 4/1998 | I et al. | 370/335 |
| 5,751,761 | 5/1998 | Gilhousen | 375/200 |
| 5,757,767 | 5/1998 | Zehavi | 370/208 |
| 5,777,990 | 7/1998 | Zehavi et al. | 370/335 |
| 5,805,567 | 9/1998 | Ramesh | 370/204 |

WALSH CHIP WITHIN A WALSH FUNCTION

|  | 0123 | 4567 | 11<br>8901 | 1111<br>2345 | 1111<br>6789 | 1222<br>0123 | 2222<br>4567 | 2223<br>8901 | 3333<br>2345 | 3333<br>6789 | 3444<br>0123 | 4444<br>4567 | 4445<br>8901 |
|---|---|---|---|---|---|---|---|---|---|---|---|---|---|
| 0 | 0000 | 0000 | 0000 | 0000 | 0000 | 0000 | 0000 | 0000 | 0000 | 0000 | 0000 | 0000 | 0000 |
| 1 | 0101 | 0101 | 0101 | 0101 | 0101 | 0101 | 0101 | 0101 | 0101 | 0101 | 0101 | 0101 | 0101 |
| 2 | 0011 | 0011 | 0011 | 0011 | 0011 | 0011 | 0011 | 0011 | 0011 | 0011 | 0011 | 0011 | 0011 |
| 3 | 0110 | 0110 | 0110 | 0110 | 0110 | 0110 | 0110 | 0110 | 0110 | 0110 | 0110 | 0110 | 0110 |
| 4 | 0000 | 1111 | 0000 | 1111 | 0000 | 1111 | 0000 | 1111 | 0000 | 1111 | 0000 | 1111 | 0000 |
| 5 | 0101 | 1010 | 0101 | 1010 | 0101 | 1010 | 0101 | 1010 | 0101 | 1010 | 0101 | 1010 | 0101 |
| 6 | 0011 | 1100 | 0011 | 1100 | 0011 | 1100 | 0011 | 1100 | 0011 | 1100 | 0011 | 1100 | 0011 |
| 7 | 0110 | 1001 | 0110 | 1001 | 0110 | 1001 | 0110 | 1001 | 0110 | 1001 | 0110 | 1001 | 0110 |
| 8 | 0000 | 0000 | 1111 | 1111 | 0000 | 0000 | 1111 | 1111 | 0000 | 0000 | 1111 | 1111 | 0000 |
| 9 | 0101 | 0101 | 1010 | 1010 | 0101 | 0101 | 1010 | 1010 | 0101 | 0101 | 1010 | 1010 | 0101 |
| 10 | 0011 | 0011 | 1100 | 1100 | 0011 | 0011 | 1100 | 1100 | 0011 | 0011 | 1100 | 1100 | 0011 |
| 11 | 0110 | 0110 | 1001 | 1001 | 0110 | 0110 | 1001 | 1001 | 0110 | 0110 | 1001 | 1001 | 0110 |
| 12 | 0000 | 1111 | 1111 | 0000 | 0000 | 1111 | 1111 | 0000 | 0000 | 1111 | 1111 | 0000 | 0000 |
| 13 | 0101 | 1010 | 1010 | 0101 | 0101 | 1010 | 1010 | 0101 | 0101 | 1010 | 1010 | 0101 | 0101 |
| 14 | 0011 | 1100 | 1100 | 0011 | 0011 | 1100 | 1100 | 0011 | 0011 | 1100 | 1100 | 0011 | 0011 |
| 15 | 0110 | 1001 | 1001 | 0110 | 0110 | 1001 | 1001 | 0110 | 0110 | 1001 | 1001 | 0110 | 0110 |
| 16 | 0000 | 0000 | 0000 | 0000 | 1111 | 1111 | 1111 | 1111 | 0000 | 0000 | 0000 | 0000 | 1111 |
| 17 | 0101 | 0101 | 0101 | 0101 | 1010 | 1010 | 1010 | 1010 | 0101 | 0101 | 0101 | 0101 | 1010 |
| 18 | 0011 | 0011 | 0011 | 0011 | 1100 | 1100 | 1100 | 1100 | 0011 | 0011 | 0011 | 0011 | 1100 |
| 19 | 0110 | 0110 | 0110 | 0110 | 1001 | 1001 | 1001 | 1001 | 0110 | 0110 | 0110 | 0110 | 1001 |
| 20 | 0000 | 1111 | 0000 | 1111 | 1111 | 0000 | 1111 | 0000 | 0000 | 1111 | 0000 | 1111 | 1111 |
| 21 | 0101 | 1010 | 0101 | 1010 | 1010 | 0101 | 1010 | 0101 | 0101 | 1010 | 0101 | 1010 | 1010 |
| 22 | 0011 | 1100 | 0011 | 1100 | 1100 | 0011 | 1100 | 0011 | 0011 | 1100 | 0011 | 1100 | 1100 |
| 23 | 0110 | 1001 | 0110 | 1001 | 1001 | 0110 | 1001 | 0110 | 0110 | 1001 | 0110 | 1001 | 1001 |
| 24 | 0000 | 0000 | 1111 | 1111 | 1111 | 1111 | 0000 | 0000 | 0000 | 0000 | 1111 | 1111 | 1111 |
| 25 | 0101 | 0101 | 1010 | 1010 | 1010 | 1010 | 0101 | 0101 | 0101 | 0101 | 1010 | 1010 | 1010 |
| 26 | 0011 | 0011 | 1100 | 1100 | 1100 | 1100 | 0011 | 0011 | 0011 | 0011 | 1100 | 1100 | 1100 |
| 27 | 0110 | 0110 | 1001 | 1001 | 1001 | 1001 | 0110 | 0110 | 0110 | 0110 | 1001 | 1001 | 1001 |
| 28 | 0000 | 1111 | 1111 | 0000 | 1111 | 0000 | 0000 | 1111 | 0000 | 1111 | 1111 | 0000 | 1111 |
| 29 | 0101 | 1010 | 1010 | 0101 | 1010 | 0101 | 0101 | 1010 | 0101 | 1010 | 1010 | 0101 | 1010 |
| 30 | 0011 | 1100 | 1100 | 0011 | 1100 | 0011 | 0011 | 1100 | 0011 | 1100 | 1100 | 0011 | 1100 |
| 31 | 0110 | 1001 | 1001 | 0110 | 1001 | 0110 | 0110 | 1001 | 0110 | 1001 | 1001 | 0110 | 1001 |
| 32 | 0000 | 0000 | 0000 | 0000 | 0000 | 0000 | 0000 | 0000 | 1111 | 1111 | 1111 | 1111 | 1111 |
| 33 | 0101 | 0101 | 0101 | 0101 | 0101 | 0101 | 0101 | 0101 | 1010 | 1010 | 1010 | 1010 | 1010 |
| 34 | 0011 | 0011 | 0011 | 0011 | 0011 | 0011 | 0011 | 0011 | 1100 | 1100 | 1100 | 1100 | 1100 |
| 35 | 0110 | 0110 | 0110 | 0110 | 0110 | 0110 | 0110 | 0110 | 1001 | 1001 | 1001 | 1001 | 1001 |

WALSH FUNCTION INDEX

SEE FIGURE 4C

SEE FIGURE 4B

FIG. 4A

WALSH CHIP WITHIN A WALSH FUNCTION
(CONTINUED FROM FIG. 4A)

| | 5555<br>2345 | 5555<br>6789 | 6666<br>0123 | |
|---|---|---|---|---|
| | 0000 | 0000 | 0000 | 0 |
| | 0101 | 0101 | 0101 | 1 |
| | 0011 | 0011 | 0011 | 2 |
| | 0110 | 0110 | 0110 | 3 |
| | 1111 | 0000 | 1111 | 4 |
| | 1010 | 0101 | 1010 | 5 |
| | 1100 | 0011 | 1100 | 6 |
| | 1001 | 0110 | 1001 | 7 |
| | 0000 | 1111 | 1111 | 8 |
| | 0101 | 1010 | 1010 | 9 |
| | 0011 | 1100 | 1100 | 10 |
| | 0110 | 1001 | 1001 | 11 |
| | 1111 | 1111 | 0000 | 12 |
| | 1010 | 1010 | 0101 | 13 |
| WALSH | 1100 | 1100 | 0011 | 14 |
| FUNCTION | 1001 | 1001 | 0110 | 15 |
| INDEX | 1111 | 1111 | 1111 | 16 |
| | 1010 | 1010 | 1010 | 17 |
| | 1100 | 1100 | 1100 | 18 |
| | 1001 | 1001 | 1001 | 19 |
| | 0000 | 1111 | 0000 | 20 |
| | 0101 | 1010 | 0101 | 21 |
| | 0011 | 1100 | 0011 | 22 |
| | 0110 | 1001 | 0110 | 23 |
| | 1111 | 0000 | 0000 | 24 |
| | 1010 | 0101 | 0101 | 25 |
| | 1100 | 0011 | 0011 | 26 |
| | 1001 | 0110 | 0110 | 27 |
| | 0000 | 0000 | 1111 | 28 |
| | 0101 | 0101 | 1010 | 29 |
| | 0011 | 0011 | 1100 | 30 |
| | 0110 | 0110 | 1001 | 31 |
| | 1111 | 1111 | 1111 | 32 |
| | 1010 | 1010 | 1010 | 33 |
| | 1100 | 1100 | 1100 | 34 |
| | 1001 | 1001 | 1001 | 35 |

FROM FIGURE 4A ←

SEE FIGURE 4D ↓

| | 0-51 | 52-63 |
|---|---|---|
| 0-35 | 4A | 4B |
| 36-63 | 4C | 4D |

FIG. 4 LAYOUT

WALSH CHIP WITHIN A WALSH FUNCTION
(CONTINUED FROM FIGURE 4A)

FROM FIGURE 4A →

WALSH FUNCTION INDEX

|    | 0123 | 4567 | 11 8901 | 1111 2345 | 1111 6789 | 2222 0123 | 2222 4567 | 2233 8901 | 3333 2345 | 3333 6789 | 4444 0123 | 4444 4567 | 4455 8901 |
|----|------|------|---------|-----------|-----------|-----------|-----------|-----------|-----------|-----------|-----------|-----------|-----------|
| 36 | 0000 | 1111 | 0000 | 1111 | 0000 | 1111 | 0000 | 1111 | 1111 | 0000 | 1111 | 0000 | 1111 |
| 37 | 0101 | 1010 | 0101 | 1010 | 0101 | 1010 | 0101 | 1010 | 1010 | 0101 | 1010 | 0101 | 1010 |
| 38 | 0011 | 1100 | 0011 | 1100 | 0011 | 1100 | 0011 | 1100 | 1100 | 0011 | 1100 | 0011 | 1100 |
| 39 | 0110 | 1001 | 0110 | 1001 | 0110 | 1001 | 0110 | 1001 | 1001 | 0110 | 1001 | 0110 | 1001 |
| 40 | 0000 | 0000 | 1111 | 1111 | 0000 | 0000 | 1111 | 1111 | 1111 | 1111 | 0000 | 0000 | 1111 |
| 41 | 0101 | 0101 | 1010 | 1010 | 0101 | 0101 | 1010 | 1010 | 1010 | 1010 | 0101 | 0101 | 1010 |
| 42 | 0011 | 0011 | 1100 | 1100 | 0011 | 0011 | 1100 | 1100 | 1100 | 1100 | 0011 | 0011 | 1100 |
| 43 | 0110 | 0110 | 1001 | 1001 | 0110 | 0110 | 1001 | 1001 | 1001 | 1001 | 0110 | 0110 | 1001 |
| 44 | 0000 | 1111 | 1111 | 0000 | 0000 | 1111 | 1111 | 0000 | 1111 | 0000 | 0000 | 1111 | 1111 |
| 45 | 0101 | 1010 | 1010 | 0101 | 0101 | 1010 | 1010 | 0101 | 1010 | 0101 | 0101 | 1010 | 1010 |
| 46 | 0011 | 1100 | 1100 | 0011 | 0011 | 1100 | 1100 | 0011 | 1100 | 0011 | 0011 | 1100 | 1100 |
| 47 | 0110 | 1001 | 1001 | 0110 | 0110 | 1001 | 1001 | 0110 | 1001 | 0110 | 0110 | 1001 | 1001 |
| 48 | 0000 | 0000 | 0000 | 0000 | 1111 | 1111 | 1111 | 1111 | 1111 | 1111 | 1111 | 1111 | 0000 |
| 49 | 0101 | 0101 | 0101 | 0101 | 1010 | 1010 | 1010 | 1010 | 1010 | 1010 | 1010 | 1010 | 0101 |
| 50 | 0011 | 0011 | 0011 | 0011 | 1100 | 1100 | 1100 | 1100 | 1100 | 1100 | 1100 | 1100 | 0011 |
| 51 | 0110 | 0110 | 0110 | 0110 | 1001 | 1001 | 1001 | 1001 | 1001 | 1001 | 1001 | 1001 | 0110 |
| 52 | 0000 | 1111 | 0000 | 1111 | 1111 | 0000 | 1111 | 0000 | 1111 | 0000 | 1111 | 0000 | 0000 |
| 53 | 0101 | 1010 | 0101 | 1010 | 1010 | 0101 | 1010 | 0101 | 1010 | 0101 | 1010 | 0101 | 0101 |
| 54 | 0011 | 1100 | 0011 | 1100 | 1100 | 0011 | 1100 | 0011 | 1100 | 0011 | 1100 | 0011 | 0011 |
| 55 | 0110 | 1001 | 0110 | 1001 | 1001 | 0110 | 1001 | 0110 | 1001 | 0110 | 1001 | 0110 | 0110 |
| 56 | 0000 | 0000 | 1111 | 1111 | 1111 | 1111 | 0000 | 0000 | 1111 | 1111 | 0000 | 0000 | 0000 |
| 57 | 0101 | 0101 | 1010 | 1010 | 1010 | 1010 | 0101 | 0101 | 1010 | 1010 | 0101 | 0101 | 0101 |
| 58 | 0011 | 0011 | 1100 | 1100 | 1100 | 1100 | 0011 | 0011 | 1100 | 1100 | 0011 | 0011 | 0011 |
| 59 | 0110 | 0110 | 1001 | 1001 | 1001 | 1001 | 0110 | 0110 | 1001 | 1001 | 0110 | 0110 | 0110 |
| 60 | 0000 | 1111 | 1111 | 0000 | 1111 | 0000 | 0000 | 1111 | 1111 | 0000 | 0000 | 1111 | 0000 |
| 61 | 0101 | 1010 | 1010 | 0101 | 1010 | 0101 | 0101 | 1010 | 1010 | 0101 | 0101 | 1010 | 0101 |
| 62 | 0011 | 1100 | 1100 | 0011 | 1100 | 0011 | 0011 | 1100 | 1100 | 0011 | 0011 | 1100 | 0011 |
| 63 | 0110 | 1001 | 1001 | 0110 | 1001 | 0110 | 0110 | 1001 | 1001 | 0110 | 0110 | 1001 | 0110 |

SEE FIGURE 4D →

FIG. 4 LAYOUT

WALSH CHIP WITHIN A WALSH FUNCTION
(CONTINUED FROM FIG. 4B AND 4C)

| 5555<br>2345 | 5555<br>6789 | 6666<br>0123 | |
|---|---|---|---|
| 0000 | 1111 | 0000 | 36 |
| 0101 | 1010 | 0101 | 37 |
| 0011 | 1100 | 0011 | 38 |
| 0110 | 1001 | 0110 | 39 |
| 1111 | 0000 | 0000 | 40 |
| 1010 | 0101 | 0101 | 41 |
| 1100 | 0011 | 0011 | 42 |
| 1001 | 0110 | 0110 | 43 |
| 0000 | 0000 | 1111 | 44 |
| 0101 | 0101 | 1010 | 45 |
| 0011 | 0011 | 1100 | 46 |
| 0110 | 0110 | 1001 | 47 |
| 0000 | 0000 | 0000 | 48 |
| 0101 | 0101 | 0101 | 49 |
| 0011 | 0011 | 0011 | 50 |
| 0110 | 0110 | 0110 | 51 |
| 1111 | 0000 | 1111 | 52 |
| 1010 | 0101 | 1010 | 53 |
| 1100 | 0011 | 1100 | 54 |
| 1001 | 0110 | 1001 | 55 |
| 0000 | 1111 | 1111 | 56 |
| 0101 | 1010 | 1010 | 57 |
| 0011 | 1100 | 1100 | 58 |
| 0110 | 1001 | 1001 | 59 |
| 1111 | 1111 | 0000 | 60 |
| 1010 | 1010 | 0101 | 61 |
| 1100 | 1100 | 0011 | 62 |
| 1001 | 1001 | 0110 | 63 |

FROM FIGURE 4B ↑

WALSH FUNCTION INDEX

← FROM FIGURE 4C

|  | 0-51 | 52-63 |
|---|---|---|
| 0-35 | 4A | 4B |
| 36-63 | 4C | 4D |

FIG. 4 LAYOUT

FIG. 4D

HIGH-DATA-RATE SUPPLEMENTAL CHANNEL FOR CDMA TELECOMMUNICATIONS SYSTEM

This application is a division of Ser. No. 08/784,281 filed Jan. 15, 1997.

BACKGROUND OF THE INVENTION

I. Field of the Invention

The present invention relates to wireless telecommunications. More particularly, the present invention relates to a novel and improved method for implementing a high-transmission-rate over-the-air interface.

II. Description of the Related Art

The IS-95 standard from the Telecommunications Industry Association (TIA), and its derivatives such as IS-95A and ANSI J-STD-008 (referred to herein collectively as IS-95), define an over-the-air interface suitable for implementing a bandwidth-efficient digital cellular telephone system. To this end, IS-95 provides a method for establishing multiple radio frequency (RF) traffic channels, each having a data transmission rate of up to 14.4 kilobits per second. The traffic channels can be used for conducting voice telephony or for conducting digital data communications including small file transfer, electronic mail, and facsimile.

While 14.4 kilobits per second is adequate for these types of lower data rate applications, the increasing popularity of more data intensive applications such as worldwide web and video conferencing has created a demand for much higher transmission rates. To satisfy this new demand, the present invention is directed towards providing an over-the-air interface capable of higher transmission rates.

FIG. 1 illustrates a highly simplified digital cellular telephone system configured in a manner consistent with the use of IS-95. During operation, telephone calls and other communications are conducted by exchanging data between subscriber units 10 and base stations 12 using RF signals. The communications are further conducted from base stations 12 through base station controllers (BSC) 14 and mobile switching center (MSC) 16 to either public switch telephone network (PSTN) 18, or to another subscriber unit 10. BSC's 14 and MSC 16 typically provide mobility control, call processing, and call routing functionality.

In an IS-95 compliant system, the RF signals exchanged between subscriber units 10 and base stations 12 are processed in accordance with code division multiple access (CDMA) signal processing techniques. The use of CDMA signal processing techniques allows adjacent base stations 12 to use the same RF bandwidth which, when combined with the use of transmit power control, makes IS-95 more bandwidth efficient than other cellular telephone systems.

CDMA processing is considered a "spread spectrum" technology because the CDMA signal is spread over a wider amount of RF bandwidth than is generally used for non-spread spectrum systems. The spreading bandwidth for an IS-95 system is 1.2288 MHz. A CDMA-based digital wireless telecommunications system configured substantially in accordance with the use of IS-95 is described in U.S. Pat. No. 5,103,450 entitled "SYSTEM AND METHOD FOR GENERATING SIGNAL WAVEFORMS IN A CDMA CELLULAR TELEPHONE SYSTEM," assigned to the assignee of the present invention and incorporated herein by reference.

It is anticipated that the demand for higher transmission rates will be greater for the forward link than for the reverse link because a typical user is expected to receive more data than he or she generates. The forward link signal is the RF signal transmitted from a base station 12 to one or more subscriber units 10. The reverse link signal is the RF signal transmitted from subscriber unit 10 to a base station 12.

FIG. 2 illustrates the signal processing associated with an IS-95 forward link traffic channel, which is a portion of the IS-95 forward link signal. The forward link traffic channel is used for the transmission of user data from a base station 12 to a particular subscriber unit 10. During normal operation, the base station 12 generates multiple forward link traffic channels, each of which is used for communication with a particular subscriber unit 10. Additionally, the base station 12 generates various control channels including a pilot channel, a sync channel, and a paging channel. The forward link signal is the sum of the traffic channels and control channels.

As shown in FIG. 2, user data is input at node 30 and processed in 20 millisecond (ms) blocks called frames. The amount of data in each frame may be one of four values with each lower value being approximately half of the next higher value. Also, two possible sets of frame sizes can be utilized, which are referred to as rate set one and rate set two.

For rate set two the amount of data contained in the largest, or "full-rate," frame corresponds to a transmission rate of 13.35 kilobits per second. For rate set one the amount of data contained in the full rate frame corresponds to a transmission rate of 8.6 kilobits per second. The smaller sized frames are referred to as half-rate, quarter-rate, and eighth-rate frames. The various frame rates are used to adjust for the changes in voice activity experienced during a normal conversation.

CRC generator 36 adds CRC data with the amount of CRC data generated dependent on the frame size and rate set. Tail byte generator 40 adds eight tail bits of known logic state to each frame to assist during the decoding process. For full-rate frames, the number of tail bits and CRC bits brings the transmission rate up to 9.6 and 14.4 kilobits per second for rate set one and rate set two.

The data from tail byte generator 40 is convolutionally encoded by encoder 42 to generate code symbols 44. Rate ½, constraint length (K) 9, encoding is performed.

Puncture 48 removes 2 of every 6 code symbols for rate set two frames, which effectively reduces the encoding performed to rate ⅔. Thus, at the output of puncture 48 code symbols are generated at 19.2 kilosymbols per second (ksps) for both rate set one and rate set two full-rate frames.

Block interleaver 50 performs block interleaving on each frame, and the interleaved code symbols are modulated with a Walsh channel code from Walsh code generator 54 generating sixty-four Walsh symbols for each code symbol. A particular Walsh channel code $W_i$ is selected from a set of sixty-four Walsh channel codes and typically used for the duration of an interface between a particular subscriber unit 10 and a base station 12.

The Walsh symbols are then duplicated, and one copy is modulated with an in-phase PN spreading code ($PN_I$) from spreading code generator 52, and the other copy is modulated with a quadrature-phase PN spreading code ($PN_Q$) from spreading code generator 53. The in-phase data is then low-pass filtered by LPF 58 and modulated with an in-phase sinusoidal carrier signal. Similarly, the quadrature-phase data is low-pass filtered by LPF 60 and modulated with a quadrature-phase sinusoidal carrier. The two modulated carrier signals are then summed to form signal s(t) and transmitted as the forward link signal.

SUMMARY OF THE INVENTION

The present invention is a novel and improved method for implementing a high-transmission-rate over-the-air interface. A transmit system provides an in-phase channel set and a quadrature-phase channel set. The in-phase channel set is used to provide a complete set of orthogonal medium rate control and traffic channels. The quadrature-phase channel set is used to provide a high-rate supplemental channel and an extended set of medium rate channels that are orthogonal to each other and the original medium rate channels. The high-rate supplemental channel is generated over a set of medium rate channels using a short channel code. The medium rate channel are generated using a set of long channel codes.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 4A–4D is a list of the set of 64-symbol Walsh codes and associated indexes used in a preferred embodiment of the invention.

DETAILED DESCRIPTION OF THE PREFERRED EMBODIMENTS

Figure 3:
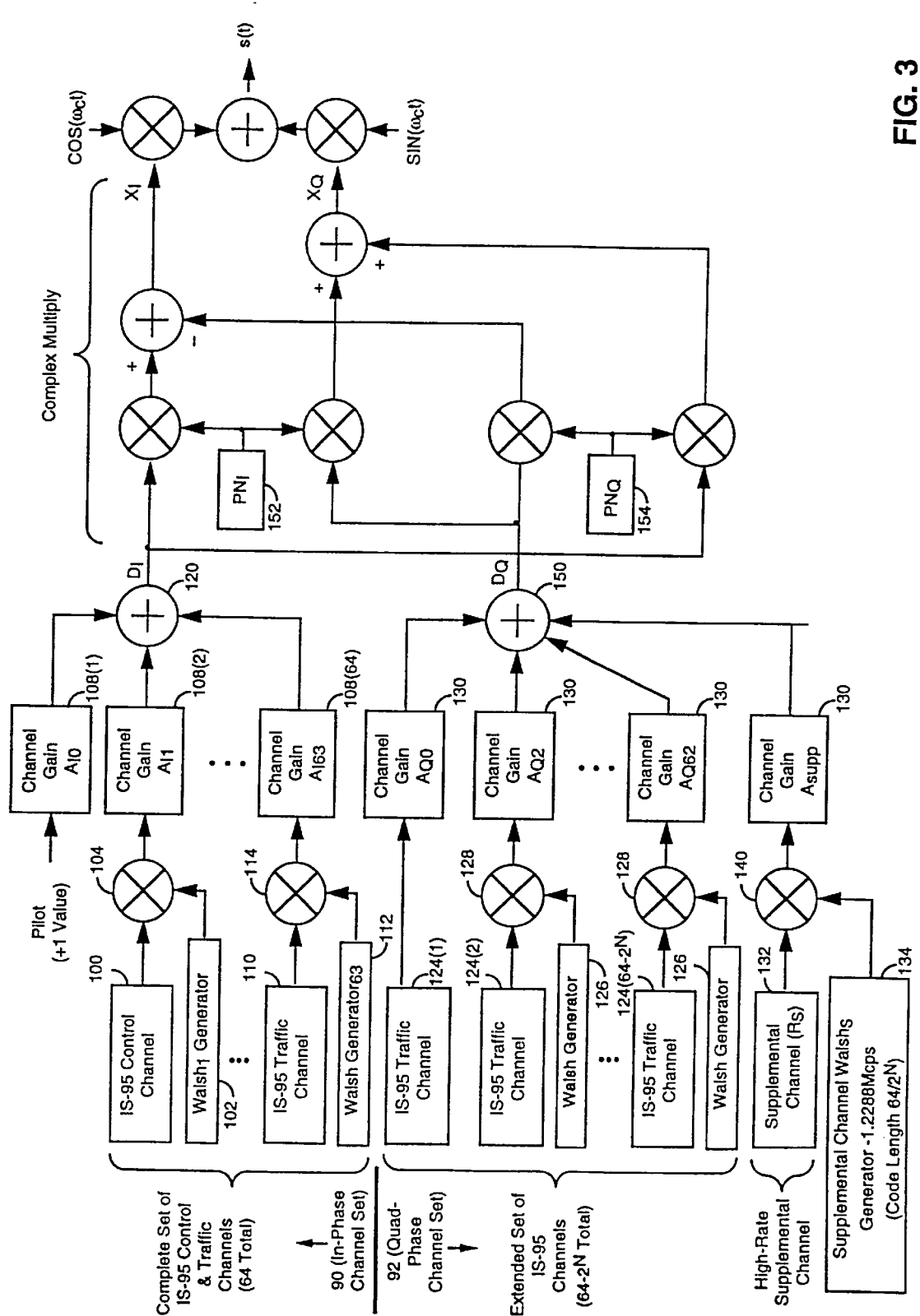
FIG. 3 is a block diagram of a transmit system configured in accordance with one embodiment of the invention.
Figure 4B:
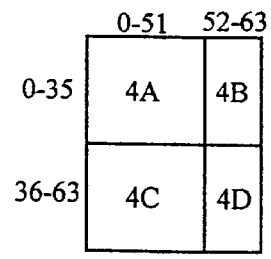
Figure 4C:
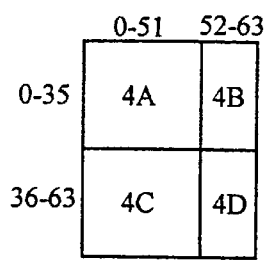

FIG. 3 is a block diagram of a transmit system configured in a manner consistent with use of the invention. Typically, the transmit system will be used to generated the forward link signal in a cellular telephone system and therefore would be incorporated into a base station 12. In the exemplary configuration shown, the transmit system generates a forward link signal that includes a complete set of IS-95, or medium rate, channels as well as a high-speed supplemental channel. Additionally, in the embodiment described, an extended set of IS-95 channels is provided. Alternative embodiments of the invention could provide more than one high-speed supplemental channel, or not provide the use of an additional set of IS-95 channels, or both. Also, while providing IS-95 channels is preferred, other embodiments of the invention may incorporate other channel types and processing protocols.

In the exemplary embodiment provided, the transmit system provides an in-phase channel set 90 and a quadrature-phase channel set 92. The in-phase channel set 90 is used to provide the complete set of orthogonal IS-95 control and traffic channels. Orthogonal channel to not interfere with one another when transmitted via the same path. The quadrature-phase channel set 92 is used to provide a high-rate supplemental channel and an extended set of IS-95 channels that are orthogonal to each other and the original IS-95 channels. In the preferred embodiment of the invention, all the signals and data shown in FIG. 3 are formed by positive and negative integer values represented by binary digital data or voltages, which correspond to a logic low and a logic high, respectively.

For the in-phase channel set 90, IS-95 control channel system 100 performs various functions associated with one of the standard IS-95 control channels including encoding and interleaving, the processing of which is described in IS-95 incorporated herein by reference. In this case, since the $Walsh_1$ channel code is used, the processing will be in accordance with the use of a paging channel. The resulting code symbols from IS-95 control channel system 100 are modulated with a Walsh code from Walsh, generator 102 by multiplier 104. The Walsh generators 102 are used to generate the orthogonal in-phase channels.

Walsh generator 102 repeatedly generates a Walsh code of index 1 ($Walsh_1$) from a set of Walsh codes of indexes 0 to 63 ($Walsh_{0-63}$). FIGS. 4A–4D is a list of the set of 64-symbol Walsh codes and associated indexes used in a preferred embodiment of the invention. A Walsh chip corresponds to a Walsh symbol and a Walsh chip value of 0 corresponds to a positive (+) integer while a Walsh chip value of 1 corresponds to a negative (−) integer. Under IS-95 Walsh, code corresponds to the paging channel. The Walsh symbols generated by modulation with the Walsh, code are gain adjusted by channel gain 108 (2).

The pilot channel is generated by gain adjusting a positive 1 value using channel gain 108 (1). No encoding is performed for the pilot channel in accordance with IS-95, as the $Walsh_0$ code used for the pilot channel is all plus 1 values, and therefore equivalent to no modulation at all.

Additional control channels are generated in similar fashion using additional IS-95 control channel systems, additional Walsh generators, and additional channel gains (all not shown). Such control channels include a synchronization channel, which is modulated with the $Walsh_{32}$ code. The processing associated with each type of IS-95 control channel is described in IS-95.

The processing associated with one of the IS-95 traffic channels in the in-phase channel set is illustrated with IS-95 traffic channel system 110, which performs various functions associated with an IS-95 traffic channel including convolutional encoding and interleaving as described above to generate a sequence of symbols at 19.2 kilosymbols per second. The code symbols from IS-95 traffic channel system 110 are modulated with the 64-symbol $Walsh_{63}$ code from $Walsh_{63}$ generator 112 by multiplier 114 to generate a sequence of symbols at 1.2288 Megasymbols per second. The Walsh symbols from multiplier 114 are gain adjusted by gain adjust 108 (64).

The outputs of all gain adjusts including gain adjusts 108 (1)–(64) are summed by summer 120 generating in-phase data $D_I$. Each gain adjust 108 increases or decreases the gain of the particular channel with which it is associated. The gain adjust can be performed in response to a variety of factors including power control commands from the subscriber unit 10 processing the associated channel, or to differences in the type of data being transmitted over the channel. By keeping the transmit power of each channel at the minimum necessary for proper communication, interference is reduced and the total transmit capacity increased. In one embodiment of the invention, gain adjusts 108 are configured by a control system (not shown) which could take the form of a microprocessor.

Within quadrature-phase channel set 92, an extended set of $64-2^N$ IS-95 traffic channels are provided using IS-95 channel systems 124. N is a integer value based on the number of Walsh channels allocated for the supplemental channel and is described in greater detail below. Each code symbols from the IS-95 channel systems 124 (2)–(64–$2^N$) is 64-symbol Walsh codes cannot be used for the other quadrature-phase channels. Table I provides a list of the possible $Walsh_S$ codes for each value of N and the corresponding sets of allocated 64-symbol Walsh codes.

TABLE I

| N | $Walsh_i$ | Allocated 64-Symbol Walsh Codes |
|---|---|---|
| 2 | +, +, +, +, +, +, +, +, +, +, +, +, +, +, +, + | 0, 16, 32, 48 |
|   | +, −, +, −, +, −, +, −, +, −, +, −, +, −, +, − | 1, 17, 33, 49 |
|   | +, +, −, −, +, +, −, −, +, +, −, −, +, +, −, − | 2, 18, 34, 50 |
|   | +, −, −, +, +, −, −, +, +, −, −, +, +, −, −, + | 3, 19, 35, 51 |
|   | +, +, +, +, −, −, −, −, +, +, +, +, −, −, −, − | 4, 20, 36, 52 |
|   | +, −, +, −, −, +, −, +, +, −, +, −, −, +, −, + | 5, 21, 37, 53 |
|   | +, +, −, −, −, −, +, +, +, +, −, −, −, −, +, + | 6, 22, 38, 54 |
|   | +, −, −, +, −, +, +, −, +, −, −, +, −, +, +, − | 7, 23, 39, 55 |
|   | +, +, +, +, +, +, +, +, −, −, −, −, −, −, −, − | 8, 24, 40, 56 |
|   | +, −, +, −, +, −, +, −, −, +, −, +, −, +, −, + | 9, 25, 41, 57 |
|   | +, +, −, −, +, +, −, −, −, −, +, +, −, −, +, + | 10, 26, 42, 58 |
|   | +, −, −, +, +, −, −, +, −, +, +, −, −, +, +, − | 11, 27, 43, 59 |
|   | +, +, +, +, −, −, −, −, −, −, −, −, +, +, +, + | 12, 28, 44, 60 |
|   | +, −, +, −, −, +, −, +, −, +, −, +, +, −, +, − | 13, 29, 45, 61 |
|   | +, +, −, −, −, −, +, +, −, −, +, +, +, +, −, − | 14, 30, 46, 62 |
|   | +, −, −, +, −, +, +, −, −, +, +, −, +, −, −, + | 15, 31, 47, 63 |
| 3 | +, +, +, +, +, +, +, + | 0, 8, 16, 24, 32, 40, 48, 56 |
|   | +, −, +, −, +, −, +, − | 1, 9, 17, 25, 33, 41, 49, 57 |
|   | +, +, −, −, +, +, −, − | 2, 10, 18, 26, 34, 42, 50, 58 |
|   | +, −, −, +, +, −, −, + | 3, 11, 19, 27, 35, 43, 51, 59 |
|   | +, +, +, +, −, −, −, − | 4, 12, 20, 28, 36, 44, 52, 60 |
|   | +, −, +, −, −, +, −, + | 5, 13, 21, 29, 37, 45, 53, 61 |
|   | +, +, −, −, −, −, +, + | 6, 14, 22, 30, 38, 46, 54, 62 |
|   | +, −, −, +, −, +, +, − | 7, 15, 23, 31, 39, 47, 55, 63 |
| 4 | +, +, +, + | 0, 4, 8, . . ., 60 |
|   | +, −, +, − | 1, 5, 9, . . ., 61 |
|   | +, +, −, − | 2, 6, 10, . . ., 62 |
|   | +, −, −, + | 3, 7, 11, . . ., 63 |
| 5 | +, + | 0, 2, 4, . . ., 62 |
|   | +, − | 1, 3, 5, . . ., 63 |
| 6 | + | 0, 1, 2, . . ., 63 | modulated with a Walsh code from Walsh generators 126 by multipliers 128, except for IS-95 traffic channel system 124 (1), which is placed on $Walsh_0$ channel, and therefore does not require modulation.

To provide the high-rate supplemental channel, supplemental channel system 132 generates code symbols at a rate $R_S$, which is $2^N$ times that of a full-rate IS-95 traffic channel. Each code symbol is modulated with a supplemental Walsh code ($Walsh_S$) from supplemental Walsh code generator 134 using multiplier 140. The output of multiplier 140 is gain adjusted by gain adjust 130. The outputs of the set of gain adjusts 130 are summed by summer 150 yielding quadrature-phase data $D_Q$. It should be understood that the extended set of IS-95 traffic channel could be completely or partially replaced with one or more additional supplemental channels.

The processing performed by supplemental channel system 132 is described in greater detail below. The $Walsh_S$ code generated by supplemental Walsh code generator 134 depends the number of Walsh codes allocated for the high-rate supplemental channel in quadrature-phase channel set 92. In the preferred embodiment of the invention, the number of Walsh channels allocated for the high-rate supplemental channel can be any value $2^N$ where N={2, 3, 4, 5, 6}. The $Walsh_S$ codes are $64/2^N$ symbols long, rather than the 64 symbols used with the IS-95 Walsh codes. In order for the high-rate supplemental channel to be orthogonal to the other quadrature-phase channels with 64-symbol Walsh codes, $2^N$ of the possible 64 quadrature-phase channels with The + and − indicate a positive or negative integer value, where the preferred integer is 1. As is apparent, the number of Walsh symbols in each $Walsh_S$ code varies as N varies, and in all instances is less than the number of symbols in the IS-95 Walsh channel codes. Thus, the supplemental channel is formed using a short Walsh channel code and the IS-95 channels are formed using longer Walsh channel codes. Regardless of the length of the $Walsh_S$ code, in the described embodiment of the invention the symbols are applied at a rate of 1.2288 Megachips per second (Mcps). Thus, shorter length $Walsh_S$ codes are repeated more often.

Data channels $D_I$ and $D_Q$ are complex multiplied, as the first real and imaginary terms respectively, with spreading codes $PN_I$ and $PN_Q$, as the second real and imaginary terms respectively, yielding in-phase (or real) term $X_I$ and quadrature-phase (or imaginary) term $X_Q$. Spreading codes $PN_I$ and $PN_Q$ are generated by spreading code generators 152 and 154. Spreading codes $PN_I$ and $PN_Q$ are applied at 1.2288 Mcps. Equation (1) illustrates the complex multiplication performed.

$$(X_I + jX_Q) = (D_I + jD_Q)(PN_I + jPN_Q) \tag{1}$$

In-phase term $X_I$ is then low-pass filtered to a 1.2288 MHz bandwidth (not shown) and upconverted by multiplication with in-phase carrier $COS(\omega_c t)$. Similarly, quadrature-phase term $X_Q$ is low-pass filtered to a 1.2288 MHz bandwidth (not shown) and upconverted by multiplication with quadrature-phase carrier $SIN(\omega_c t)$. The upconverted $X_I$ and $X_Q$ terms are summed yielding forward link signal s(t).

The complex multiplication allows quadrature-phase channel set 92 to remain orthogonal to the in-phase channel set 90 and therefore to be provided without adding additional interference to the other channels transmitted over the same path with perfect receiver phase recovery. Thus, a complete set of sixty-four Walsh$_i$ channels is added in an orthogonal manner to the original IS-95 channel set, and this channel set can be used for the supplemental channel. Additionally, by implementing the supplemental channel in the orthogonal quadrature-phase channel set 92, a subscriber unit 10 configured to process the normal IS-95 forward link signal will still be able to processes the IS-95 channels within in-phase channel set 90 thus providing the high-transmission-rate channel while maintaining backwards compatibility with previously existing systems.

While the embodiment of the invention shown in FIG. 3 uses a single set of in-phase and quadrature-phase carriers to generate the in-phase and quadrature-phase channel set, separate sets of sinusoids could be used to independently generate the in-phase and quadrature-phase channel sets, with the second set of carriers offset from the first set by 90°. For example, the $D_Q$ data could be applied to the second set of carrier sinusoids where the $D_Q$ in-phase (PNI) spread data is applied to $COS(\omega_c t - 90°)$ and the $D_Q$ quadrature-phase (PNQ) spread data is applied to $SIN(\omega_c t - 90°)$. The resulting signals are then summed to produce the quadrature-phase channel set 92, which in turn are summed with the in-phase channel set 90.

The use of the Walsh$_S$ channels as set forth in Table I. also allows simplified implementation of the supplemental channel within quadrature-phase channel set 92. In particular, the use of the Walsh$_S$ codes listed in Table I allows the supplemental channel to use whole subsets of 64 symbol Walsh$_i$ codes without the need to generate each and everyone of those Walsh codes.

For example, when N=5 the Walsh$_S$ codes specified by Table I allocate a set of 32 64-symbol Walsh$_i$ codes for the supplemental channel. That is, all the even-indexed 64-symbol Walsh codes or all of the odd-indexed 64-symbol Walsh codes are allocated for the supplemental channel. This leaves the odd-indexed or even-index channels, respectively, for implementing the extended IS-95 traffic channel set. In FIG. 3, the supplemental channel uses the odd 64-symbol Walsh code channels when Walsh$_S$={+,-} and the even channels are available for the extended IS-95 traffic channel set.

In another example, when N=4, the associated Walsh$_S$ codes allocate a set of sixteen 64-symbol Walsh$_i$ codes. This leaves a set of forty-eight remaining Walsh$_i$ codes for implementing the extended IS-95 traffic channels or for implementing additional supplemental channels. In general, the use of the Walsh$_S$ code that corresponds to a particular value N allocates $2^N$64-symbol Walsh$_i$ codes for the supplemental channel using only a single, and shorter, Walsh$_S$ code.

The allocation of whole subsets of Walsh$_i$ codes using a single Walsh$_S$ code is facilitated by even distribution the 64-symbol Walsh$_i$ codes within the subset. For example, when N=5 the Walsh$_i$ codes are separated by 2, and when N=4 the Walsh$_i$ codes are separated by 4. Only by providing a complete set of quadrature-phase channels 92 for implementing the supplemental channel can the allocation of large set of evenly spaced Walsh$_i$ channels be performed, and therefore implemented using a single Walsh$_S$ code.

Also, allocating a subset of 64-symbol Walsh$_i$ codes using a single shorter Walsh$_S$ code reduces the complexity associated with providing a high-rate supplemental channel. For example, performing actual modulation using the set of 64-symbol Walsh$_i$ codes, and summing of the resulting modulated data would require a substantial increase in signal processing resources when compared with the use of the single Walsh$_S$ generator used in the implementation of the invention described herein.

Sets of evenly spaces Walsh$_i$ channels could not be allocated as easily if the supplemental channel were placed in the in-phase channel set 90 of the previously existing IS-95 forward link, or in the in-phase and quadrature-phase channels with QPSK modulation. This is because certain sixty-four symbol Walsh$_i$ channels are already allocated for control functions such as the paging, pilot, and sync channels on the in-phase channel. Thus, using a new quadrature-phase Walsh code space allows for simplified implementation of the supplemental channel.

Also, the use of the a single Walsh$_S$ code improves the performance of the high-rate supplemental channel because the variance in the amplitude of the supplemental channel is minimized. In the embodiment described herein, the amplitude is simply based on the positive or negative integer associated with the Walsh$_S$ code. This is in contrast to performing the modulation with a set of $2^N$ 64-symbol Walsh$^i$ codes, which would result in the set of amplitudes 0, +2, -2, +4, -4, . . . ,$2^N$, and $-2^N$.

Among other improvements, reducing the variance in the amplitude reduces the peak-to-average power ratio, which increases the range at which the forward link signal can be received for a given maximum transmit power of the base station 12, or other forward link transmit system.

Figure 1:
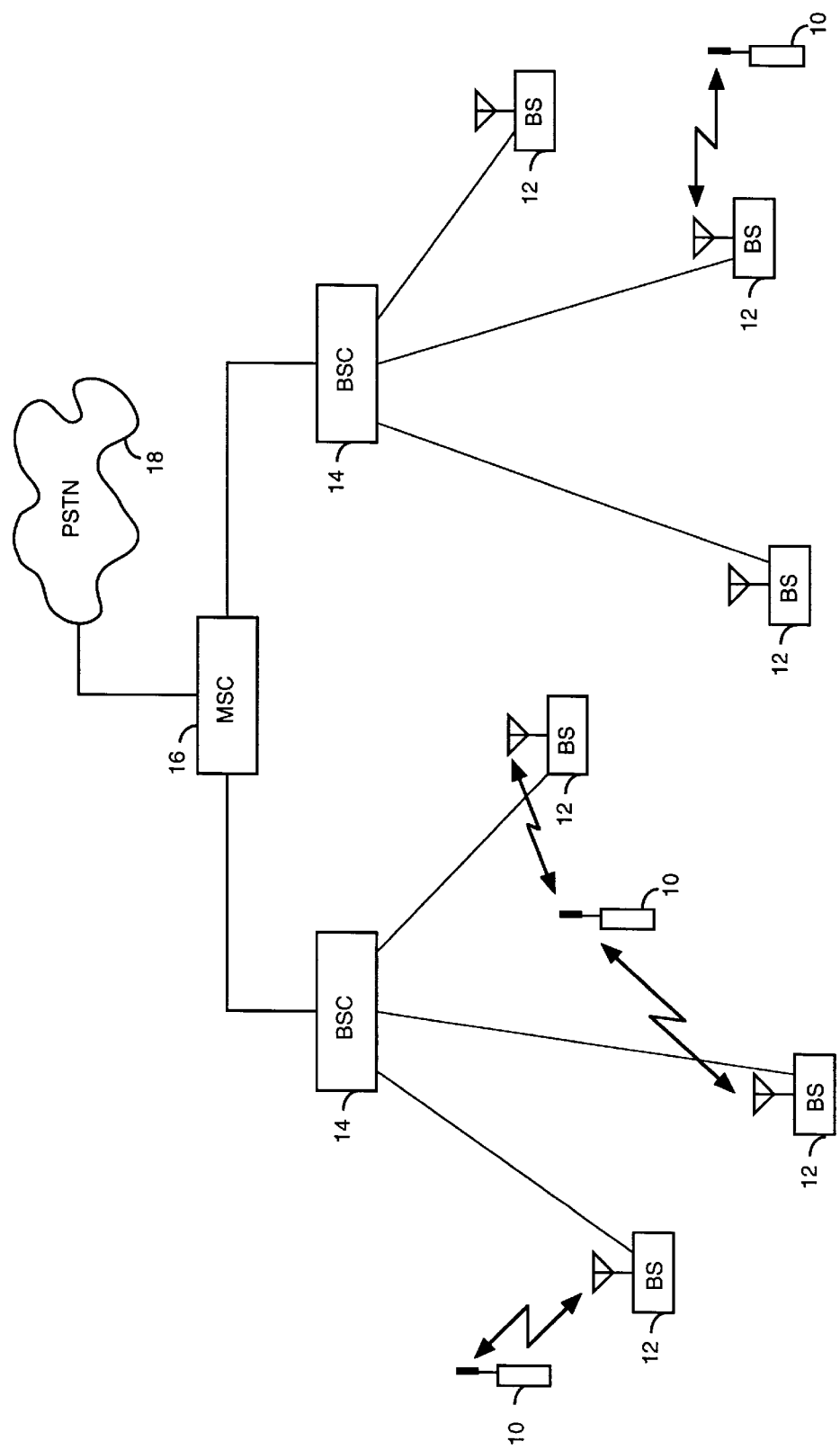
FIG. 1 is a block diagram of a cellular telephone system.
Figure 2:
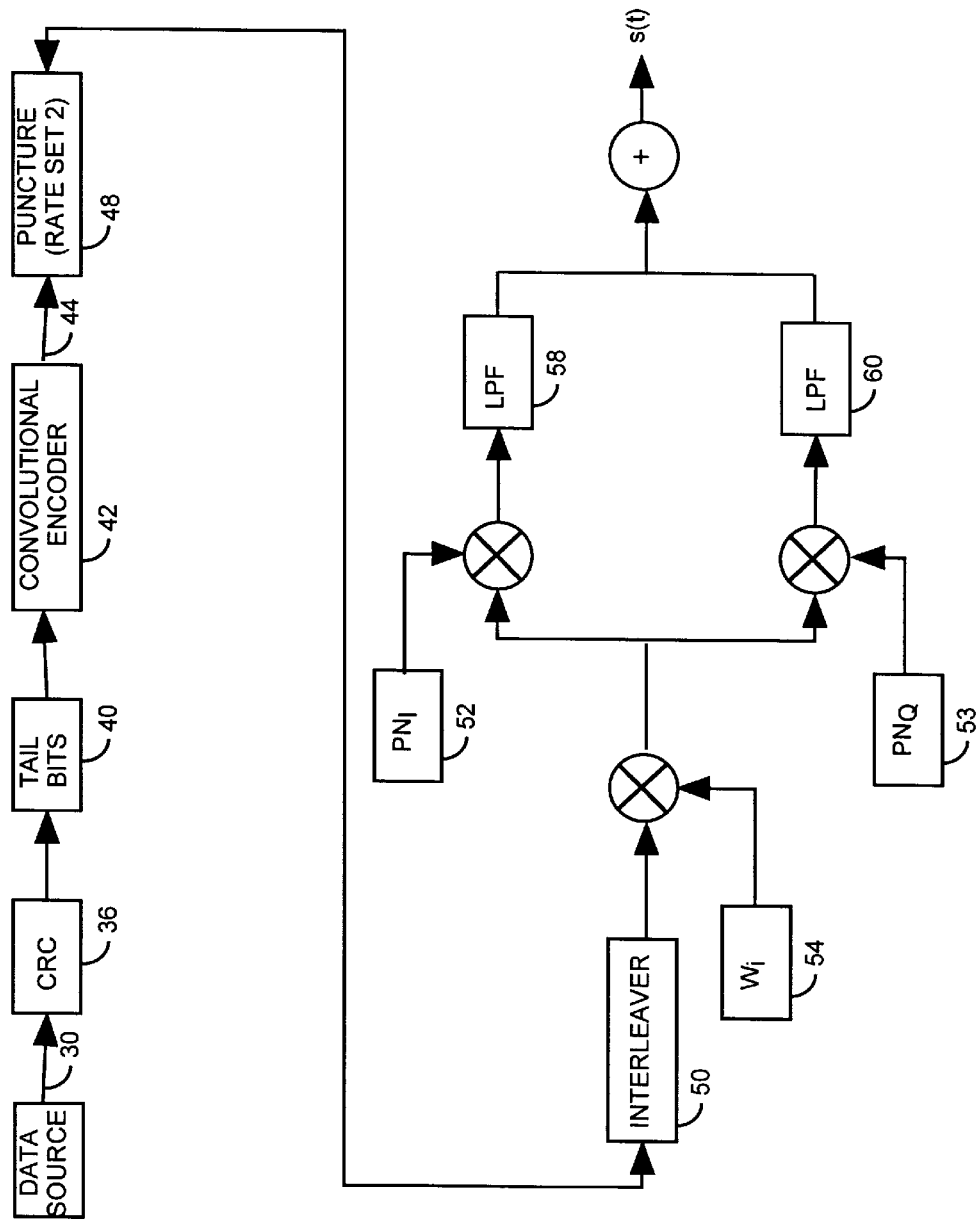
FIG. 2 is a block diagram of the forward link signal processing associated with the IS-95 standard.
Figure 5:
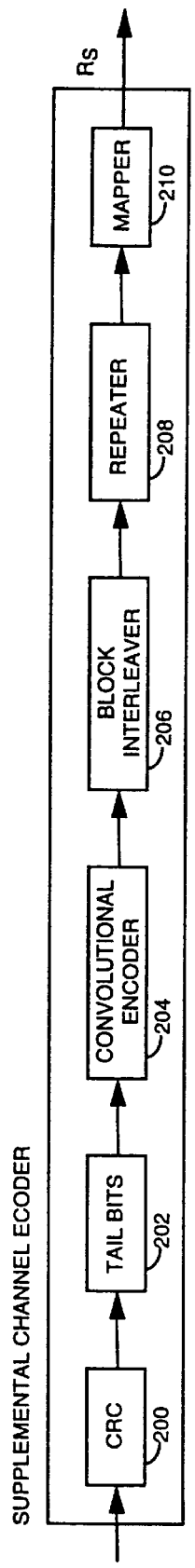
FIG. 5 is a block diagram of the channel coding performed in accordance with one embodiment of the invention.

FIG. 5 is a block diagram of the supplemental channel system 132 of FIG. 1 when configured in accordance with one embodiment of the invention. User data is received by CRC checksum generator 200 which adds checksum information to the data received. In the preferred embodiment of the invention, the data is processed in 20 ms frames as is performed for IS-95, and 16 bits of checksum data is added. Tail bits 202 adds eight tail bits to each frame. The output of tail bits 202 is received at a data rate D by convolutional encoder 204 which performs convolutional encoding at rate $R_c$ on each frame. $R_c$ differs for different embodiments of the invention as described in greater detail below.

Block interleaver 206 interleaves the code symbols from convolutional encoder 204 and repeater 208 repeats the code symbol sequence from interleaver 206 by a repeat amount M. The repeat amount M varies in different embodiments of the invention, and will typically depend on the coding rate $R_c$ and the supplemental channel rate $R_S$ (see FIG. 3). The repeat amount is discussed further below. Mapper 210 receives the code symbols from repeater 208 and converts the logic zeros and logic ones into positive and negative integer values which are output at the supplemental channel rate $R_S$.

Table II provides a list of data input rates D, encoding rates $R_c$, repeat amounts M, and supplemental channel rates $R_S$ that can be used in different embodiments of the invention. In some embodiments multiple rates are used.

TABLE II

| Convolutional Encoder Input Rate (D) kbps | (N) | Walsh Channels for Supp. Channel ($2^N$) | Convolutional Code Rate ($R_c$) | Repetition Amount (M) | Walsh Symbols/ Code Symbols (W/S) | Convolutional Encoder Input Bits | Number of Channel Bits per Frame |
|---|---|---|---|---|---|---|---|
| 38.4 | 2 | 4 | _½ | 1 | 16/1 | 768 | 1,536 |
| 38.4 | 3 | 8 | _¼ | 1 | 8/1 | 768 | 3,072 |
| 38.4 | 4 | 16 | _¼ | 2 | 4/1 | 768 | 6,144 |
| 38.4 | 5 | 32 | _¼ | 4 | 2/1 | 768 | 12,288 |
| 38.4 | 6 | 64 | _¼ | 8 | 1/1 | 768 | 24,576 |
| 76.8 | 3 | 8 | _½ | 1 | 8/1 | 1,536 | 3,072 |
| 76.8 | 4 | 16 | _¼ | 1 | 4/1 | 1,536 | 6,144 |
| 76.8 | 5 | 32 | _¼ | 2 | 2/1 | 1,536 | 12,288 |
| 76.8 | 6 | 64 | _¼ | 4 | 1/1 | 1,536 | 24,576 |
| 153.6 | 4 | 16 | _½ | 1 | 4/1 | 3,072 | 6,144 |
| 153.6 | 5 | 32 | _¼ | 1 | 2/1 | 3,072 | 12,288 |
| 153.6 | 6 | 64 | _¼ | 2 | 1/1 | 3,072 | 24,576 |

Three encoder input rates D for the supplemental channel are shown: 38.4, 76.8, and 153.6 kilobits per second. For each of these encoder input rates D, a set of encoder rates $R_c$, N values, and repeat amounts M are provided which achieve the desired encoder input rate D. Additionally, the ratio of $Walsh_S$ symbols to code symbols is provided, which corresponds to the length of the $Walsh_S$ code. Also, the number of encoder input bits per 20 frame is provided, as is the number of code symbols transmitted per 20 ms frame. The actual data transmission rate will be equal to the encoder input rate D, less the overhead necessary for the CRC bits and tail bits and any other control information provided. The use of Reed-Soloman encoding in addition to, or instead of, CRC checksum encoding is also contemplated.

In general, it is desirable to use the largest value of N possible for the supplemental channel in order to spread the supplemental channel over the greatest number of $Walsh_i$ channels. Spreading the supplemental channel out over a larger set of $Walsh_i$ channels minimizes the effect of inter-channel interference between the two corresponding $Walsh_i$ channels on the in-phase channel set 90 and the quadrature-phase channel set 92. This inter-channel interference is created by imperfect phase alignment experienced during receive processing. By spreading out the supplemental channel over a larger set of $Walsh_i$ channels, the amount of inter-channel interference experience for any particular $Walsh_i$ channel in the in-phase channel set 90 is minimized, because the portion of the supplemental channel in that $Walsh_i$ channel is small. Also, spreading the supplemental channel over a larger set of $Walsh_i$ channels with a larger total channel symbol rate allows for a higher symbol diversity, which improves performance in fading channel conditions.

When the number of Walsh channels needed for the desired encoder input rate D using rate ½ encoding is less than the number of available Walsh channels by at least a factor of two, performance is improved by spreading the signal over more Walsh channels. The higher channel symbol rate for the larger number of Walsh channels is obtained by using a rate ¼, rather than a rate ½, code, or by sequence repetition, or both. The rate ¼ code provides additional coding gain over that of a rate ½ code in benign and fading channel conditions and the sequence repetition provides improved performance in fading channel conditions due to the increased diversity.

In a preferred embodiment of the invention, a supplemental channel having an encoder input rate of 76.8 kilobits per second is provided using N=5, an encoder rate $R_c$ of ¼, and a repetition amount of M=2. Such an implementation provides data transfer rates on the order of an ISDN channel including sufficient bandwidth for signaling. Also, using N=5 maintains 32 additional $Walsh_i$ channels for providing extended IS-95 channels.

The actual sustainable transmission rate of the supplemental channel will vary depending on a variety of environmental conditions including the amount of multipath experienced by the forward link transmission. The supplemental transmission rate depends of the amount of multipath because forward link signals that arrive via different paths are no longer orthogonal and therefore interfere with one another. This interference increases with increased transmission rates because of the additional transmit power necessary. Thus, the more multipath interference experienced, the less the sustainable transmission rate of the supplemental channel. Therefore, a lower transmission rate for the supplemental channel is preferred for high multipath environments.

In one embodiment of the invention, a control system that measures the various environmental factors and which selects the optimal supplemental channel processing characteristics is contemplated. Also, the use of signal cancellation is contemplated for removing noise due to multipath transmissions. A method and apparatus for performing such noise cancellation is described in copending U.S. patent application Ser. No. 08/518,217 entitled "METHOD AND SYSTEM FOR PROCESSING A PLURALITY OF MULTIPLE ACCESS TRANSMISSIONS" assigned to the assignee of the present invention and incorporated herein by reference.

Figure 6:
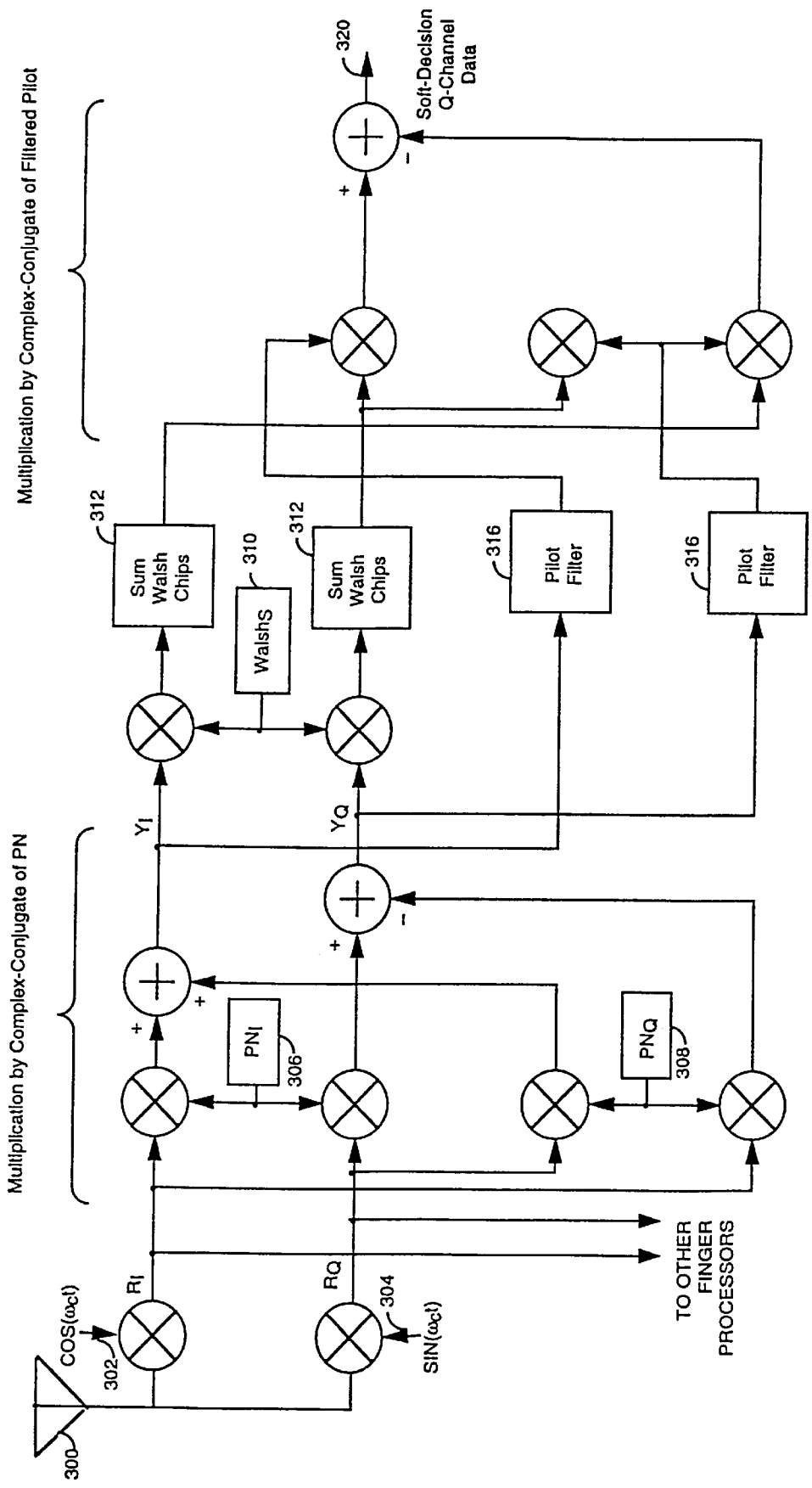
FIG. 6 is a block diagram of a receive system configured in accordance with one embodiment of the invention.

FIG. 6 is a block diagram of a receive processing system for processing the high-rate supplemental channel in accordance with one embodiment of the invention. Typically, the receive processing system will be implemented in a subscriber unit 10 of a cellular telephone system.

During operation, RF signals received by antenna system 300 are downconverted with in-phase carrier 302 and quadrature-phase carrier 304 generating digitized in-phase receive samples $R_I$ and quadrature-phase receive samples $R_Q$. These receive samples are provided to the finger processor module shown and to other finger processors (not shown) in accordance with the use of a rake receiver. Each finger processor processes one instance of the supplemental forward link signal received, with each instance generated by multipath phenomena.

The in-phase and quadrature-phase receive samples $R_I$ and $R_Q$ are multiplied with the complex conjugate of the PN spreading codes generated by in-phase spreading code generator 306 and quadrature-phase spreading code generator 308 yielding receive terms $Y_I$ and $Y_Q$. The receive terms $Y_I$ and $Y_Q$ are modulated with the Walsh$_S$ code generated by Walsh generator 310, and the resulting modulated data is summed over the number of Walsh symbols in the Walsh$_S$ code by summers 312. Additionally, the receive terms $Y_I$ and $Y_Q$ are summed and filtered (averaged) by pilot filters 316.

The outputs of summers 312 are then multiplied with the complex conjugate of the filter pilot data, and the resulting quadrature-phase term is used at the supplemental channel soft-decision data 320. Supplemental soft-decision data 320 can then be combined with soft-decision data from other finger processors (not shown) and the combined soft-decision data decoded.

Figure 7:
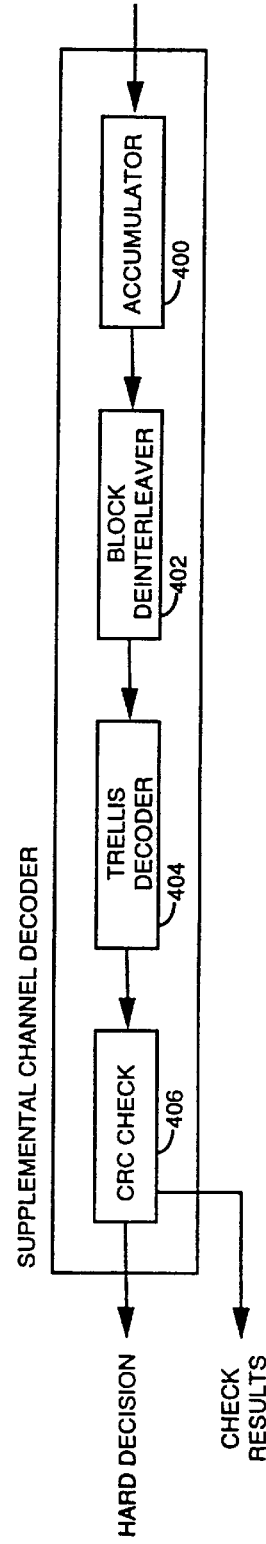
FIG. 7 is a block diagram of a decoding system configured in accordance with one embodiment of the invention.

FIG. 7 is a block diagram of decoder system used to decode the supplemental soft-decision data 320 in accordance with one embodiment of the invention. The soft-decision data is received by accumulator 400 which accumulates samples of the soft-decision data by the repeat amount M. The accumulated data is then deinterleaved by block deinterleaver 402 and decoded by trellis decoder 404. Various types of decoders are well known including Viterbi decoders.

The user data in the hard-decision data from trellis decoder 404 is then checked with the CRC checksum data by CRC check system 406, and the resulting user data is output along with check results indicating whether the user data was consistent with the check sum data. The receive processing system or user can then determine whether to use the user data based on the CRC checksum results.

Thus, a high data rate transmission system particularly suited for use in conjunction with the IS-95 forward link has been described. The invention can be incorporated into both terrestrial as well as satellite based wireless communication systems, as well as wire based communication systems over which sinusoidal signals are transmitted such as coaxial cable systems. Also, while the invention is described in the context of a 1.2288 MHz bandwidth signal, the use of other bandwidths is consistent with the operation of the invention including 2.5 MHz and 5.0 MHz systems.

Similarly, while the invention is described using transmission rates on the order of 10 kbps and 70 kbps, the use of other channel rates may be employed. In a preferred embodiment of the invention, the various systems described herein are implemented using semiconductor integrated circuits coupled via conduct, inductive, and capacitive connections, the use of which is well known in the art.

The previous description is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for transmitting a high data rate channel in conjunction with a set of medium rate communications using code division multiple access processing comprising the steps of:

a) generating an in-phase set of medium rate channels;

b) generating a quadrature-phase set of medium rate channels;

c) transmitting said set of high data rate channel over said in-phase set of medium rate channels; and d) transmitting said high-rate communication over a subset of said quadrature-phase set of medium rate channels.

2. The method as set forth in claim 1 wherein said subset is comprised of a set of evenly space Walsh channels.

3. The method of claim 1 wherein steps a) is comprised of the step of:

generating said set of channels by modulating said set of medium rate communications with a set of long channel codes;

summing said set of channels yielding summed data;

generating in-phase spread data in response to said summed data and an in-phase spreading code;

generating quadrature-phase spread data in response to said summed data and a quadrature-phase spreading code;

modulating said in-phase spread data with an in-phase carrier yielding an in-phase signal;

modulating said quadrature-phase spread data with a quadrature-phase carrier yielding a quadrature-phase signal; and summing said in-phase signal and said quadrature phase signal.

4. The method of claim 1 wherein steps b) is comprised of the step of:

generating said high-rate channel by modulating said high-rate communication with a short channel code;

generating high-rate in-phase spread data in response to said high-rate channel and said in-phase spreading code;

generating high-rate quadrature-phase spread data in response to said high-rate data and a quadrature-phase spreading code;

modulating said high-rate in-phase spread data with an quadrature-phase carrier yielding an high-rate quadrature-phase signal;

modulating an inverted instance of said high-rate quadrature-phase spread data with an in-phase-phase carrier yielding a high-rate in-phase-phase signal; and summing said high-rate in-phase signal and said high-rate quadrature phase signal.

5. The method of claim 1 wherein steps a) and b) are comprised of the steps of:

a.1) modulating said set of medium rate communications using a set of channel codes;

a.2) summing said set of channel codes yielding summed data;

a.3) modulating said summed data with a first set of carrier sinusoids;

b.1) modulating said high-rate channel with a short channel code yielding said high-rate channel; and b.2) modulating said high-rate channel with a second set of carrier sinusoids that are 90° out of phase with said first set of carrier sinusoids.

6. The method as set forth in claim 5 wherein said short channel code is comprised of two Walsh symbols and said long channel codes are each comprised of sixty-four Walsh symbols.

* * * * *